United States Patent [19]
Shinn

[11] Patent Number: 5,993,127
[45] Date of Patent: Nov. 30, 1999

[54] LOAD HOLDING STRAP WRAPPER

[76] Inventor: Shawn M. Shinn, R.R. 1, Box 43, Hide-A-Way Hills, Ohio 43107

[21] Appl. No.: 09/104,440

[22] Filed: Jun. 25, 1998

[51] Int. Cl.$^6$ ..................................................... B60P 7/08
[52] U.S. Cl. ............................. 410/100; 410/97; 410/103
[58] Field of Search ............................. 410/12, 97, 100, 410/103; 242/390.2, 397, 397.5, 404.2, 129.3, 532.7, 395, 532; 24/265 CD, 68 CD; 248/499

[56] References Cited

U.S. PATENT DOCUMENTS

| | | | |
|---|---|---|---|
| D. 182,753 | 5/1958 | Allen | 242/395 X |
| 865,625 | 9/1907 | Baker | 242/397.5 X |
| 2,178,673 | 11/1939 | Serrurier | 242/530 |
| 2,396,451 | 3/1946 | Warkentin | 242/532.6 |
| 3,954,226 | 5/1976 | Pickering | 242/395 |
| 4,007,887 | 2/1977 | Vice | 242/532.6 |
| 4,266,740 | 5/1981 | Ramos et al. | 242/532.6 |
| 4,311,288 | 1/1982 | Galland | 242/532.6 |
| 4,390,141 | 6/1983 | Webster | 410/100 X |
| 4,884,928 | 12/1989 | Nachtigall et al. | 410/103 |
| 4,900,203 | 2/1990 | Pope | 410/100 X |
| 5,145,299 | 9/1992 | Stephenson, Jr. | 410/100 |
| 5,205,509 | 4/1993 | Noggle | 242/406 |
| 5,445,339 | 8/1995 | Reazer et al. | 242/395 X |
| 5,664,918 | 9/1997 | Heider et al. | 410/103 |
| 5,807,045 | 9/1998 | Profit | 410/97 X |
| 5,860,777 | 1/1999 | Walsh et al. | 410/100 |

*Primary Examiner*—Stephen T. Gordon
*Attorney, Agent, or Firm*—Gordon C. Fell

[57] ABSTRACT

A load holding strap having a J-shaped hook on one end is provided together with a strap winding mechanism including a handled rotary torque input shaft driving a rotary torque output shaft having an exposed outer end equipped with a blade-type support structure with which the strap hook is loosely engageable. The strap hook and support structure are configured relative to each other such that when the hook is loosely engageable over the support structure for rotary torque drive therefrom and the strap is at least lightly tensioned the strap may be tightly wound about the strap hook when the support structure is rotated in a direction initially winding the strap across the open throat of the strap hook and the tension of the strap will cause the hook to be disengaged from the support structure when the support structure is rotated in the opposite direction attempting to initially wind the strap about the outer surfaces of the strap hook.

12 Claims, 2 Drawing Sheets

LOAD HOLDING STRAP WRAPPER

CROSS-REFERENCE TO RELATED APPLICATIONS

Not Applicable.

STATEMENT REGARDING FEDERAL SPONSORED RESEARCH OR DEVELOPMENT

Not Applicable.

BACKGROUND OF THE INVENTION

Field of the Invention

This invention relates to a load holding strap having a J-shaped hook on one end and a winding mechanism for the strap including a handled rotary torque input shaft driving a rotary torque output shaft having an exposed outer end equipped with a blade-type support structure thereon with which the strap hook is loosely engageable.

The load holding strap is adapted to have the J-shaped hook thereon engaged with an elongated anchor flange extending longitudinally of one longitudinal side margin of a flat bed semitrailer or the like and the strap is adapted to extend over a load positioned on the trailer and have the free end thereof anchored to the opposite side longitudinal marginal portion of the trailer by any suitable conventional anchor structure capable of tightening the strap over the load as the free end of the strap is anchored to the other side margin portion of the trailer.

The J-shaped hook is of conventional design and the blade type support structure with which the hook is loosely engageable is configured in a manner such that, when the strap is at least lightly tensioned and the support structure is rotated in a direction initially winding the strap across the open throat of the strap hook, the strap will be tightly wound about the hook, but when the support structure is rotated in the opposite direction attempting to wind the strap about the outer surfaces of the strap hook the tension of the strap will cause the strap hook to be pulled from the rotating support structure of the strap hook. Thus, the strap hook engaged support structure of the strap winder or winding mechanism is configured in a manner such that a slightly tensioned load holding strap may be wound in only one direction about the strap hook.

By allowing the strap to wind in only one direction it is wound in a manner such that the roll of the wound strap may be held between the thumb and first finger of the hand of the user and with the free end of the strap clamped between the palm and the second, third and fourth finger of the user with the rolled strap beneath the strap free end. The rolled portion of the strap may then be thrown in an under hand manner from one side of the trailer, over a load on the trailer and down over the far side of the trailer with the hook end of the strap projecting below the anchor flange on the far longitudinal side of the trailer and the hook opening upwardly and inwardly toward the anchor flange. Then, the free end of the strap still held by the user may be pulled in order to pull the strap over the load and the J-shaped hook upwardly toward and into hooked engagement with the anchor flange. Thereafter, the free end of the strap may be engaged with and tightly downwardly tensioned and secured relative to the same side of the trailer upon which the user is disposed.

Therefore, the user may readily throw five to eight straps over a load on a trailer and anchor the free ends of the straps to the side of the trailer upon which he or she is disposed in a minimum of time and without the user having to walk around to the far side of the trailer.

DESCRIPTION OF RELATED ART

The following prior U.S. patents disclose winding mechanisms which include some of the basic structural and operational features of the instant invention:

| | |
|---|---|
| 2,178,673 | 2,396,451 |
| 3,954,226 | 4,007,887 |
| 4,266,740 | 4,311,288 |
| 4,390,141 | 5,205,509 |

U.S. Pat. No. 2,178,673 to Serrurier discloses that it is old to utilize different driving ratios for driving winding spools from a hand crank.

U.S. Pat. No. 2,396,451 Warkentin and U.S. Pat. No. 5,205,509 Nogel disclose flat hose winding devices adapted to be mounted from fire trucks.

U.S. Pat. Nos. 4,266,740 to Ramos et al, U.S. Pat. No. 4,311,288 to Galland, U.S. Pat. No. 4,390,141 to Webster, U.S. Pat. No. 3,954,226 to Pickering and U.S. Pat. No. 4,007,226 to Vice disclose strap winding devices.

However, these prior patents do not disclose winding devices specifically designed for use in conjunction with J-type strap hooks carried by load binding straps and with the portion of the strap winding device with which the J-shaped hook is to be engaged being configured relative to the hook in a manner such that the J-shaped hook will be maintained in proper engagement with the strap winding device during attempted winding of the strap only if the hook is engaged with the winding device in a manner to wind the hook end of the strap first about the throat of the hook as opposed to first about the outer surfaces of the hook.

SUMMARY OF THE INVENTION

The load holding strap wrapper or winding mechanism of the instant invention has been designed to wind load holding straps to be used on flat bed trailers only in one direction about the J-shaped hooks carried by one set of corresponding ends of the straps. By winding the straps only in a one direction, "fail-safe manner," the strap rolls may be thrown, under hand, over a load on a flat bed trailer from one side of the trailer and suitably tensioned and anchored to that one side of the trailer with the hooks of the straps being automatically properly hook engaged with the anchor flange extending along the longitudinal margin of the far side of the trailer.

If five to eight straps are utilized to secure a load and a delivery person has to make ten stops a day to unload lumber, concrete structures, etc., the time savings in re-securing the straps each time the remaining load must be re-secured to the flat bed trailer before traveling to the next stop is appreciable. Such savings in time can add up, over a days time, to approximately a 2 hour savings in time and, when considering 2 hours wage earnings of a driver and 2 hours time for the truck, the total savings each day may amount to a considerable amount of money.

The main object of this invention is to provide a load holding strap wrapper or wrapping mechanism which may be effectively used to wind load holding straps utilized on flat bed trailers in only one manner and with that manner enabling a wound strap to be thrown over a load on a flat bed trailer in an under hand manner such that take up tensioning and anchoring of the free end of the strap from the side of the trailer upon which the user is disposed will automatically properly hook engage the strap hooks with the anchor flange on the opposite side of the trailer.

Another object of this invention is to provide a strap winder having a handled rotary torque input shaft drivingly coupled to a rotary torque output shaft provided for supporting and winding a load binding strap and with the handled rotary torque input shaft driving the rotary torque output shaft in a manner to cause multiple rotations of the rotary torque output shaft in response to a single rotation of the rotary torque input shaft.

Still another object of this is to provide a strap winder in accordance with the preceding objects and including readily releasable clamp structure thereon constructed in a manner whereby the strap winding winder may be releasably clamped to a strap hook anchor flange extending along one side of a flat bed trailer.

A final object of this invention to be specifically enumerated herein is to provide a load holding strap wrapper in accordance with the preceding objects and which will conform to conventional forms of manufacture, be of simple construction, and easy to use so as to provide a device that will be economically feasible, long-lasting, and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
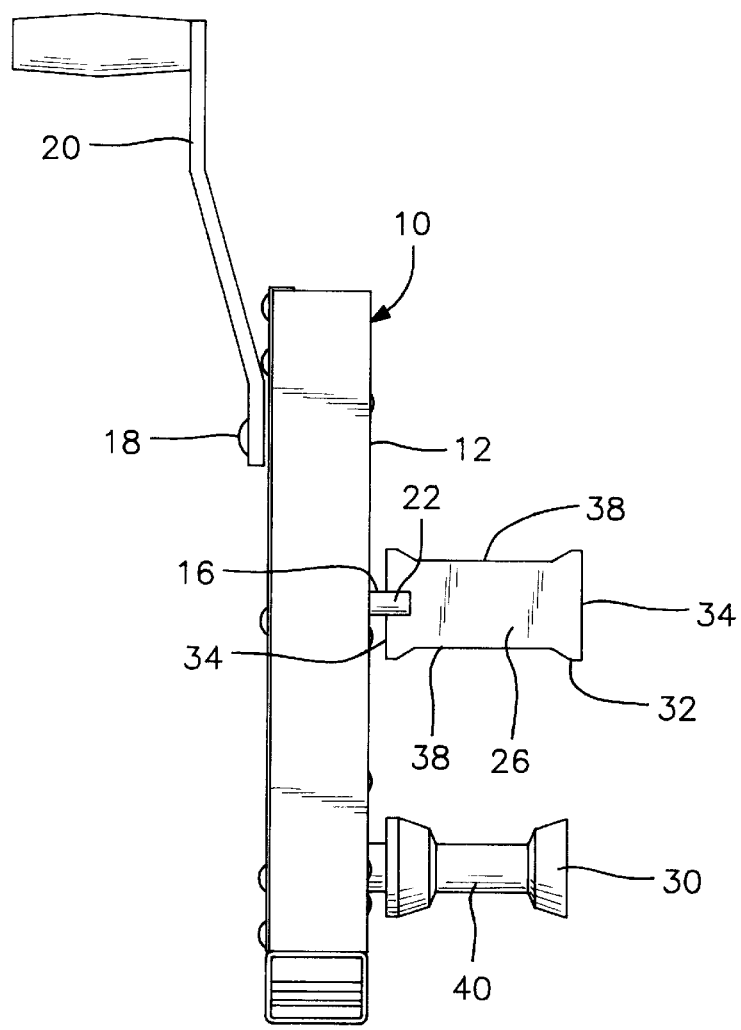
FIG. 1 is a top plan view of the load holding strap wrapper or winder of the instant invention.
Figure 2:
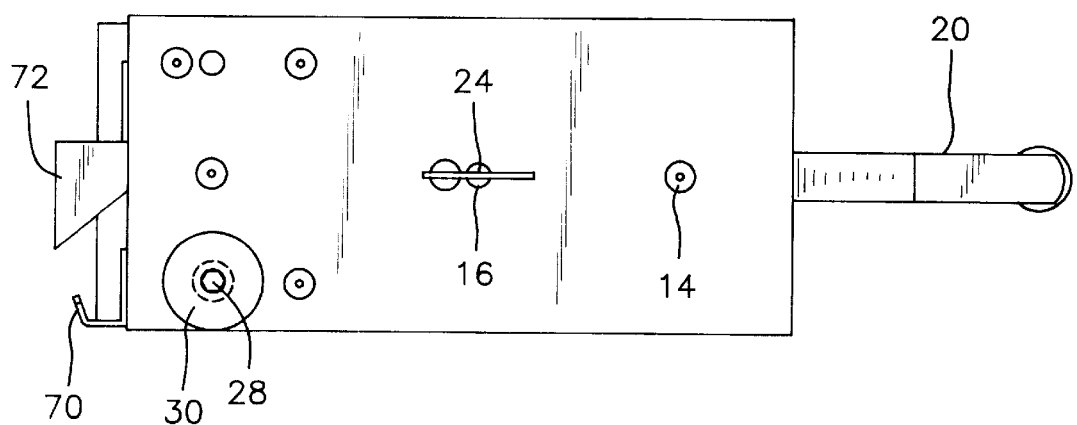
FIG. 2 is a side elevational view of the strap wrapper as seen from the right side of FIG. 1.

Referring now more specifically to FIGS. 1 and 2 of the drawings, the numeral 10 generally designates the strap wrapper or winder of the instant invention. The strap wrapper 10 includes a support or hollow housing 12 from which a rotary torque input shaft 14 and a rotary torque output shaft 16 are journalled. The rotary torque input shaft 14 includes an end 18 projecting from one side of the housing 12 from which a crank handle 20 is supported for applying rotary torque to the shaft 14.

The rotary torque output shaft 16 includes a free end 22 projecting outwardly from the side of the housing 12 opposite the crank handle 20, and the free end 22 includes a diametric slot 24 therein in which one end of a generally rectangular plate like support structure means 26 is secured for rotation with the shaft 16. In addition, a support shaft 28 projects outwardly of the side of the housing 12 from which the output shaft 16 projects and has an idle roller 30 journalled thereon.

The housing 12 may enclose a drive train including gears, chains, belts, etc. which drivingly connect the shaft 14 to the shaft 16 for rotating the latter multiple times (six for example) for every revolution of shaft 14.

The generally rectangular support structure 26 includes opposite longitudinal side edges 32 and opposite end edges 34. The central portion of one of the end edges 34 is seated and secured in the diametric slot 24 formed in the outer end of the rotary torque output shaft 16. In addition, the opposite side edges 32 of the support structure 26 each include central elongated notches 38 formed therein intermediate of the ends of the edges 32 for purposes to be herein after more fully set forth. In addition, the idle roller 30 includes a central groove 40 formed therein with which the notches 38 are aligned.

Figure 3:
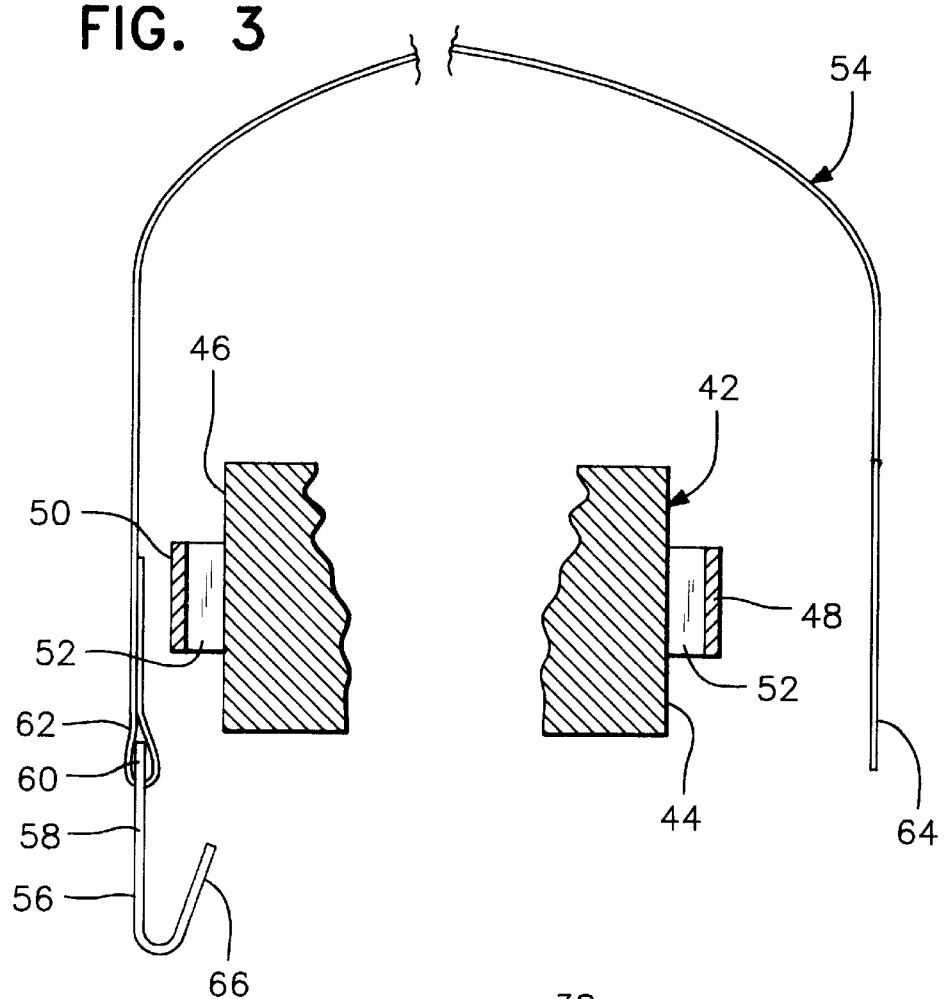
FIG. 3 is a fragmentary vertical sectional view illustrating the manner in which a load binding strap, properly wound by the strap wrapper of the instant invention, may be thrown over a flat bed semi-trailer from one near side thereof in a manner to properly position the J-shaped hook on the strap for upward movement into proper hooked engagement with the hook anchor flange disposed on the far longitudinal side marginal edge portion of the flat bed trailer.
Figure 4:
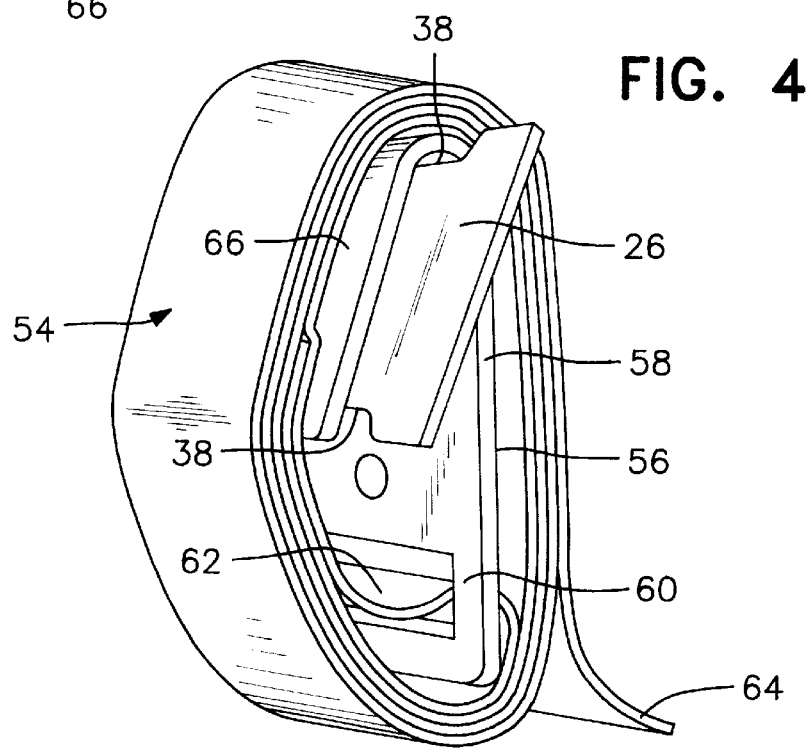
FIG. 4 is perspective view illustrating the manner in which a load binding strap (shortened) is properly wound through utilization of the load holding strap wrapper of the instant invention.

With attention now directed more specifically to FIGS. 3 and 4, a flat bed trailer is generally designated by the reference numeral 42 and includes opposite side longitudinal margins 44 and 46 equipped with elongated longitudinally extending and edge upstanding anchor flanges 48 and 50, respectively. The flanges 48 and 50 each are supported from the longitudinal marginal portions 44 and 46 in outstanding relation thereto by sets of longitudinally spaced support flanges 52 extending between the anchor flanges 48 and 50 and the longitudinal marginal portions 44 and 46.

A typical load binding strap utilized in conjunction with flat bed trailers is referred to in general by the reference numeral 54 and includes a J-shaped hook 56 on one end thereof. The hook 56 includes a first long flange 58 anchored at one end 60 thereof to a first end 62 of the strap 54 and the strap 54 includes an opposite free end 64. The J-shaped hook 56 also includes a short flange 66 comprising a reversely turned end of the first flange 58 remote from the end 60 thereof and the second flange 66 diverges, slightly, in the opening direction of the hook 56, relative to the first flange 58.

As may be best be seen from FIG. 4, the width of the flanges 58 and 66 is slightly greater than the width of the strap 54. In addition, the length of the notches 38 is slightly greater than the width of the flanges 58 and 66. Further, it is to be understood that the width of the groove 40 is slightly greater than the width of the strap 54.

As further may be seen from FIG. 4, the hook 56 is engageable with the support structure 26 with the flanges 58 and 66 registered with notches 38. Because the flanges 58 and 66 are receivable in the notches 38, once rotary torque is applied to the J-shaped hook 56 from the support structure 26, the ends of the notches 38 prevent the hook 56 from shifting along the support structure 26 toward the housing 12 and binding therewith and also shifting of the hook along the support structure 26 away from the housing 12 and thus accidental disengagement of the hook 56 from the support structure 26.

When the crank handle 20, as seen in FIG. 2, is rotated in a counter-clockwise direction (most convenient for a right-handed person), the support structure 26 and the hook 56 are rotated in a counter-clockwise direction while the free end 64 of the strap 54 passed over the idle roller and back to the left hand of the user of the winder 10.

Use of the roller 30 is not imperative to effective operation of the winder 10, inasmuch as the left hand of the user could slip-engage the free end 64 of the strap 54 below the rotary input shaft 14. However, use of the roller 30 enables the free end 64 of the strap 54 to be slip-engaged by the left hand of the user at an elevation substantially corresponding to the elevation of the rotary input shaft 14 and thus more comfort by the user.

It is important to note that proper operation of the winder 10 is achieved only when the hook 56 is engaged with the support structure 26 in the manner illustrated in FIG. 4 and the support structure 26 is rotated in a counter-clockwise direction. If the hook 56 was oppositely engaged with the support structure 26, slight tension of the strap 54 caused by the belt passing about the idle roller 30 and slip-engagement of the free end 64 by the left hand of the user, upon approximately 90 degrees of rotation of the support structure 26 in a counter-clockwise direction from a position thereof illustrated in FIG. 4, would cause the oppositely engaged hook 56 to swing to a generally horizontal position with the short flange 66 upper most and the hook opening to the right as viewed in FIG. 4. Tension of the free end 64 of the strap 54 then pulling in a left-wise direction in FIG. 4 would slip the hook 56 from engagement with the support structure 26. This "fail-safe" operation of the winder 10 ensures that the strap 54 will be properly wound in the manner illustrated in FIG. 4 only when the hook 56 is engaged with the support 26 in the manner illustrated in FIG. 4.

After proper winding, the strap 54 may be held, in rolled form with the roll beneath the strap free end, in the right hand of the user between his or her thumb and first finger with the free end 64 clamped to the palm of his or her hand by the second, third and fourth fingers. Then, the roll may be thrown up and over the flat bed trailer 42 and any load disposed thereon in under hand manner. As the roll unrolls during flight over the trailer 42, the hook end of the strap 54 will assume a position such as that illustrated in the left hand portion of FIG. 3 with the hook 56 opening upwardly and toward the anchor flange 48. Then, the end 64 of the strap held by the user may be pulled over the load on the trailer 42 until the hook 56 moves upwardly and properly engages the anchor flange 48 from beneath. Thereafter, the end of the strap held by the user may be tensioned and anchored to the adjacent side marginal portion 46 of the trailer 42 by any suitable conventional tensioning and anchor structure (not shown) provided on the trailer 42.

The end of the housing 12 remote from the rotary input shaft 14 includes a stationary upwardly opening hook 70 and a vertically reciprocal downwardly opening hook 72 which is spring urged downwardly. If it is desired, the housing 12 may have the stationary hook 70 engaged beneath one of the anchor flanges 48 and 50 and the upper hook 72 engaged over the anchor flange, thus securely, but removably, supporting the housing 12 from the anchor flange when it is desired to wind one or more of the straps.

Although the strap wrapper 10 is illustrated in a form adapted to be used by a right-handed person, the shafts 14, 16 and 28 are reversible, thus enabling the strap wrapper also to be used, comfortably by a left-handed person.

It is also important to note that, since the hook 56 is loosely engaged over the support structure 26, the wound strap 54 may be easily axially withdrawn from the shaft 16 and support structure 26 without the hook 56 and inner convolutions of the strap 54 being displaced axially outwardly relative to the outer convolutions of the strap 54.

The foregoing is considered as illustrative only of the principles of the invention. Further, since numerous modifications and changes readily will occur to those skilled in art, it is not desired to limit the invention to the exact construction and operation shown and described, and, accordingly, all suitable modifications and equivalent may be resorted to falling within the scope of the invention.

What is claimed as new is as follows:

1. In combination, an elongated strap having first and second ends, a substantially J-shaped strap hook on said first end opening toward said strap second end, said strap hook defining a first long flange anchored at one end thereof to said strap first end and a second short flange supported from and reversely turned relative to a second end of said long flange, a strap winder including a support having rotary torque input shaft journalled therefrom and adapted to have rotary input torque applied thereto and a rotary torque output shaft journalled therefrom driven from said input shaft, said rotary torque output shaft including an outer end portion supporting a generally diametric plate-like support structure therefrom extending lengthwise of said outer end portion and projecting laterally outwardly of opposite sides thereof, said plate-like support structure being of a length extending longitudinally of said output shaft a distance greater than the width of said first and second flanges and of a width less than the length of said long flange, said strap hook being loosely engageable over said support structure for rotary torque drive therefrom when said strap is at least lightly tensioned to tightly wind said strap about said strap hook when said support structure is rotated in a direction initially winding said strap first end across the open throat of said strap hook and to allow the tension of said strap to cause said hook to be disengaged from said support structure when said support structure is rotated in the opposite direction attempting to wind said strap first end about outer surfaces of said strap hook.

2. The combination of claim 1, wherein said plate-like support structure includes opposite outer side edges remote from and generally parallelling a center axis of rotation of said torque output shaft, said outer side edges being longer that the width of said long and short flanges and each side edge including an elongated notch formed therein intermediate its opposite ends, each of said long and short flanges being slightly narrower than the length of said notches.

3. The combination of claim 1, wherein said outer end portion of said torque output shaft has a diametric slot formed therein, said plate-like support structure comprising an elongated, generally rectangular plate having opposite end and longitudinal side edges, the longitudinal mid portion of one of said end edges being seated and secured in said diametric slot.

4. The combination of claim 1, including a centrally grooved guide roller journalled from said support for rotation about an axis generally paralleling and spaced laterally of said output shaft, said guide roller being aligned with said support structure and the width of a groove in said roller being slightly greater than the width of said strap.

5. The combination of claim 4, wherein said support comprises an elongated structure having a first end portion from which said input shaft is journalled and a second end portion from which said guide roller is journalled, said output shaft being disposed intermediate said input shaft and guide roller, said input shaft including a crank handle thereon and being disposed to one side of said support and said grooved roller and said output shaft being disposed on another opposite side of said support, said second end portion including releasable clamp structure for clamped support of said support from a truck bed longitudinal marginal edge portion with said support first end portion projecting outwardly of said longitudinal edge portion.

6. The combination of claim 5, wherein said plate-like support structure includes opposite outer side edges remote from and generally parallelling a center axis of rotation of said torque output shaft, said outer side edges being longer that the width of said long and short flanges and each side edge including an elongated notch formed therein intermediate its opposite ends, each of said long and short flanges being slightly narrower than the length of said notches.

7. The combination of claim 6, wherein said outer end portion of said torque output shaft has a diametric slot formed therein, said plate-like support structure comprising an elongated, generally rectangular plate having opposite end edges interconnecting said side edges, the longitudinal mid portion of one of said end edges being seated and secured in said diametric slot.

8. In combination, an elongated strap having first and second ends, a substantially J-shaped strap hook on said first end opening toward said strap second end, said strap hook defining a first long flange anchored at one end thereof to said strap first end and a second short flange supported from and reversely turned relative to a second end of said long flange, a strap winder including a support having a driven torque output shaft journalled therefrom, a support structure means carried by said torque output shaft for rotation therewith, said strap hook being loosely engageable over said support structure means for rotary torque drive therefrom, said strap hook and support structure means being configured relative to each other such that when said strap is at least lightly tensioned and said strap hook is engaged over said support structure means, said strap will be tightly wound about said strap hook when said support structure means is rotated in a direction initially winding said strap first end across the open throat of said strap hook and the tension of said strap will cause said hook to be disengaged from said support structure means by the tension of said strap when said support structure means is rotated in an opposite direction attempting to wind said strap about outer surfaces of said strap hook.

9. The combination of claim 8, wherein said support structure means comprises a plate-like structure, said plate-like support structure including opposite outer side edges remote from and generally parallelling a center axis of rotation of said torque output shaft, said outer said edges being longer than the width of said long and short flanges and each side edge including an elongated notch formed therein intermediate its opposite ends, each of said long and short flanges being slightly narrower than the length of said notches.

10. The combination of claim 9, wherein said output shaft includes an outer end having a diametric slot formed therein, said plate-like structure comprising an elongated, generally rectangular plate having opposite end edges interconnecting said side edges, the longitudinal midportion of one of said end edges being seated and secured in said diametric slot.

11. The combination of claim 8, including a centrally grooved guide roller journalled from said support for rotation about an axis generally parallelling and spaced laterally of said output shaft, said guide roller being aligned with said support structure means and the width of a groove of said roller being slightly greater than the width of said strap.

12. The combination of claim 11, wherein said support comprise an elongated member having a first end portion from which a rotary torque input means is journalled and a second end portion from which said guide roller is journalled, said output shaft being disposed intermediate said torque input means and said guide roller, said torque input means comprising a handled torque input shaft being disposed to one side of said support and said grooved roller and output shaft being disposed to another opposite side of said support, said second end portion including releasable clamp structure for clamped support from a truck bed longitudinal marginal edge portion with said elongated member second end portion projecting outwardly of said marginal edge portion.

* * * * *